(12) United States Patent
Lambov

(10) Patent No.: US 7,949,679 B2
(45) Date of Patent: May 24, 2011

(54) EFFICIENT STORAGE FOR FINITE STATE MACHINES

(75) Inventor: Branimir Z. Lambov, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 12/042,566

(22) Filed: Mar. 5, 2008

(65) Prior Publication Data

US 2009/0228502 A1 Sep. 10, 2009

(51) Int. Cl.
*G06F 17/30* (2006.01)

(52) U.S. Cl. ............ 707/790; 707/802; 704/2; 704/231; 704/232; 326/40; 326/46

(58) Field of Classification Search .................. 707/101, 707/802; 704/2, 231–232, 251, 255; 710/8, 710/23; 711/147; 715/531
See application file for complete search history.

(56) References Cited

U.S. PATENT DOCUMENTS

| | | | | |
|---|---|---|---|---|
| 5,272,478 A * | 12/1993 | Allen | | 341/107 |
| 5,596,331 A * | 1/1997 | Bonaffini et al. | | 342/455 |
| 5,737,621 A * | 4/1998 | Kaplan et al. | | 715/255 |
| 6,233,544 B1 * | 5/2001 | Alshawi | | 704/2 |
| 6,742,164 B1 * | 5/2004 | Gillam | | 715/255 |
| 7,180,328 B2 | 2/2007 | Gould et al. | | |
| 7,225,188 B1 * | 5/2007 | Gai et al. | | 1/1 |
| 7,644,080 B2 * | 1/2010 | Mammen et al. | | 707/713 |
| 2001/0002199 A1 * | 5/2001 | Hershey et al. | | 370/505 |
| 2002/0023256 A1 * | 2/2002 | Seawright | | 716/18 |
| 2002/0049734 A1 * | 4/2002 | Loo | | 707/1 |
| 2003/0005413 A1 * | 1/2003 | Beer et al. | | 717/125 |
| 2003/0061361 A1 * | 3/2003 | Bacik et al. | | 709/228 |
| 2003/0215031 A1 * | 11/2003 | Schaumont et al. | | 375/340 |
| 2004/0064735 A1 * | 4/2004 | Frazier et al. | | 713/201 |
| 2004/0162827 A1 * | 8/2004 | Nakano | | 707/6 |
| 2005/0025195 A1 * | 2/2005 | Barrett et al. | | 370/532 |
| 2006/0020595 A1 * | 1/2006 | Norton et al. | | 707/6 |
| 2006/0167915 A1 | 7/2006 | Furlong et al. | | |
| 2006/0235811 A1 * | 10/2006 | Fairweather | | 706/12 |
| 2007/0009066 A1 * | 1/2007 | Fredriksson | | 375/326 |
| 2007/0083352 A1 * | 4/2007 | Raghavan et al. | | 703/16 |
| 2007/0088955 A1 * | 4/2007 | Lee et al. | | 713/176 |
| 2007/0094192 A1 * | 4/2007 | Aurora et al. | | 706/46 |
| 2007/0192286 A1 * | 8/2007 | Norton et al. | | 707/2 |
| 2007/0282573 A1 * | 12/2007 | Fritz et al. | | 703/2 |
| 2007/0299668 A1 * | 12/2007 | Allauzen et al. | | 704/255 |
| 2008/0015838 A1 * | 1/2008 | Stern | | 703/15 |
| 2008/0071757 A1 * | 3/2008 | Ichiriu et al. | | 707/4 |
| 2008/0071765 A1 * | 3/2008 | Ichiriu et al. | | 707/5 |
| 2008/0071779 A1 * | 3/2008 | Mammen et al. | | 707/6 |
| 2008/0071780 A1 * | 3/2008 | Ichiriu et al. | | 707/6 |
| 2008/0071781 A1 * | 3/2008 | Ninan et al. | | 707/6 |
| 2008/0133523 A1 * | 6/2008 | Norton et al. | | 707/6 |
| 2008/0140631 A1 * | 6/2008 | Pandya | | 707/3 |
| 2008/0282041 A1 * | 11/2008 | Hartwich et al. | | 711/147 |
| 2008/0306737 A1 * | 12/2008 | Johnston et al. | | 704/235 |
| 2009/0125976 A1 * | 5/2009 | Wassermann et al. | | 726/1 |
| 2010/0161834 A1 * | 6/2010 | Newald et al. | | 710/8 |

* cited by examiner

*Primary Examiner* — Hanh B Thai
(74) *Attorney, Agent, or Firm* — Cantor Colburn LLP; Raymond Szeto

(57) ABSTRACT

A method of operating a storage of a finite state machine includes organizing information concerning an operation of the machine in a payload-transition matrix, in which a given number of columns of the matrix reflect features of a state of the machine and other columns describe valid transitions between the states of the machine depending on input characters, and compressing the payload-transition matrix in a row-displaced format.

16 Claims, 10 Drawing Sheets

FIG. 2A
(PRIOR ART)

| Trans | W | e | d | n | s | a | y | T | u | h | r | M | o | S | t | F | i |
|---|---|---|---|---|---|---|---|---|---|---|---|---|---|---|---|---|---|
| 1  | 2 |   |   |   |   |   |   | 11 |   |   |   | 14 |   | 16 |   | 20 |   |
| 2  |   | 3 |   |   |   |   |   |   |   |   |   |   |   |   |   |   |   |
| 3  |   |   | 4 |   |   |   |   |   |   |   |   |   |   |   |   |   |   |
| 4  |   |   |   | 5 |   |   |   |   |   |   |   |   |   |   |   |   |   |
| 5  |   | 6 |   |   |   |   |   |   |   |   |   |   |   |   |   |   |   |
| 6  |   |   |   |   | 7 |   |   |   |   |   |   |   |   |   |   |   |   |
| 7  |   |   | 8 |   |   |   |   |   |   |   |   |   |   |   |   |   |   |
| 8  |   |   |   |   |   | 9 |   |   |   |   |   |   |   |   |   |   |   |
| 9  |   |   |   |   |   |   | 10 |   |   |   |   |   |   |   |   |   |   |
| 10 |   |   |   |   |   |   |   |   |   |   |   |   |   |   |   |   |   |
| 11 |   |   |   |   |   |   |   |   | 5 | 12 |   |   |   |   |   |   |   |
| 12 |   |   |   |   |   |   |   |   | 13 |   |   |   |   |   |   |   |   |
| 13 |   |   |   |   |   |   |   |   |   |   | 6 |   |   |   |   |   |   |
| 14 |   |   |   |   |   |   |   |   |   |   |   |   |   | 15 |   |   |   |
| 15 |   |   |   | 7 |   |   |   |   |   |   |   |   |   |   |   |   |   |
| 16 |   |   |   |   | 17 |   |   |   | 15 |   |   |   |   |   |   |   |   |
| 17 |   |   |   |   |   |   |   |   |   |   |   |   |   |   | 18 |   |   |
| 18 |   |   |   |   |   |   |   |   | 19 |   |   |   |   |   |   |   |   |
| 19 |   |   |   |   |   |   |   |   |   |   | 7 |   |   |   |   |   |   |
| 20 |   |   |   |   |   |   |   |   |   |   | 21 |   |   |   |   |   |   |
| 21 |   |   |   |   |   |   |   |   |   |   |   |   |   |   |   |   | 7 |

FIG. 2B
(PRIOR ART)

| Prod | W | e | d | n | s | a | y | T | u | h | r | M | o | S | t | F | i |
|------|---|---|---|---|---|---|---|---|---|---|---|---|---|---|---|---|---|
| 1    |   |   |   |   |   |   |   |   |   |   |   |   |   |   |   |   |   |
| 2    | 3 |   |   |   |   |   |   |   |   |   |   |   |   |   |   |   |   |
| 3    |   |   |   |   |   |   |   |   |   |   |   |   |   |   |   |   |   |
| 4    |   |   |   |   |   |   |   |   |   |   |   |   |   |   |   |   |   |
| 5    |   |   |   |   |   |   |   |   |   |   |   |   |   |   |   |   |   |
| 6    |   |   |   |   |   |   |   |   |   |   |   |   |   |   |   |   |   |
| 7    |   |   |   |   |   |   |   |   |   |   |   |   |   |   |   |   |   |
| 8    |   |   |   |   |   |   |   |   |   |   |   |   |   |   |   |   |   |
| 9    |   |   |   |   |   |   |   |   |   |   |   |   |   |   |   |   |   |
| 10   |   |   |   |   |   |   |   |   |   |   |   |   |   |   |   |   |   |
| 11   |   |   |   |   |   |   |   |   |   |   | 4 |   |   |   |   |   |   |
| 12   |   |   |   |   |   |   |   |   |   |   |   |   |   |   |   |   |   |
| 13   |   |   |   |   |   |   |   |   |   |   |   |   |   |   |   |   |   |
| 14   |   |   |   |   |   |   |   |   |   |   |   |   |   | 1 |   |   |   |
| 15   |   |   |   |   |   |   |   |   |   |   |   |   |   |   |   |   |   |
| 16   |   |   |   |   |   | 6 |   |   |   | 7 |   |   |   |   |   |   |   |
| 17   |   |   |   |   |   |   |   |   |   |   |   |   |   |   |   |   |   |
| 18   |   |   |   |   |   |   |   |   |   |   |   |   |   |   |   |   |   |
| 19   |   |   |   |   |   |   |   |   |   |   |   |   |   |   |   |   |   |
| 20   |   |   |   |   |   |   |   |   |   |   |   |   | 5 |   |   |   |   |
| 21   |   |   |   |   |   |   |   |   |   |   |   |   |   |   |   |   |   |

FIG. 2C
(PRIOR ART)

| 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|----|----|----|----|----|----|----|----|----|----|----|----|
|   |   |   |   |   |   |   |   |   | Fin |   |   |   |   |   |   |   |   |   |    |    |

FIG. 5

|    | Fin  | Pr | W | e | d | n | s | a | y | T  | u  | h | r | M  | o | S  | t | F  | i |
|----|------|----|---|---|---|---|---|---|---|----|----|---|---|----|---|----|---|----|---|
| 1  |      |    | 2 |   |   |   |   |   |   | 11 |    |   |   | 14 |   | 16 |   | 20 |   |
| 2  |      |    | 3 |   |   |   |   |   |   |    |    |   |   |    |   |    |   |    |   |
| 3  |      | 3  |   |   | 4 |   |   |   |   |    |    |   |   |    |   |    |   |    |   |
| 4  |      |    |   |   |   | 5 |   |   |   |    |    |   |   |    |   |    |   |    |   |
| 5  |      |    |   | 6 |   |   |   |   |   |    |    |   |   |    |   |    |   |    |   |
| 6  |      |    |   |   |   |   | 7 |   |   |    |    |   |   |    |   |    |   |    |   |
| 7  |      |    |   | 8 |   |   |   |   |   |    |    |   |   |    |   |    |   |    |   |
| 8  |      |    |   |   |   |   |   | 9 |   |    |    |   |   |    |   |    |   |    |   |
| 9  |      |    |   |   |   |   |   |   |   | 10 |    |   |   |    |   |    |   |    |   |
| 10 | true |    |   |   |   |   |   |   |   |    |    |   |   |    |   |    |   |    |   |
| 11 |      |    |   |   |   |   |   |   |   |    | 22 | 12 |  |    |   |    |   |    |   |
| 12 |      | 4  |   |   |   |   |   |   |   |    | 13 |   |   |    |   |    |   |    |   |
| 13 |      |    |   |   |   |   |   |   |   |    |    |   | 6 |    |   |    |   |    |   |
| 14 |      |    |   |   |   |   |   |   |   |    |    |   |   |    |   | 15 |   |    |   |
| 15 |      | 1  |   |   |   | 7 |   |   |   |    |    |   |   |    |   |    |   |    |   |
| 16 |      |    |   |   |   |   |   | 17 |  |    | 23 |   |   |    |   |    |   |    |   |
| 17 |      | 6  |   |   |   |   |   |   |   |    |    |   |   |    |   |    |   | 18 |   |
| 18 |      |    |   |   |   |   |   |   |   |    | 19 |   |   |    |   |    |   |    |   |
| 19 |      |    |   |   |   |   |   |   |   |    |    |   | 7 |    |   |    |   |    |   |
| 20 |      |    |   |   |   |   |   |   |   |    |    |   | 21 |  |   |    |   |    |   |
| 21 |      | 5  |   |   |   |   |   |   |   |    |    |   |   |    |   |    |   |    | 7 |
| 22 |      | 2  | 6 |   |   |   |   |   |   |    |    |   |   |    |   |    |   |    |   |
| 23 |      | 7  |   |   | 7 |   |   |   |   |    |    |   |   |    |   |    |   |    |   |

| Fin | Pr | W | e | D | n | s | a | y | T | u | h | r | M | o | S | t | F | i |
|-----|----|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 |

41

| Index | 0 | 1 | 2 | 3 | 4 | 5 | 6 | 7 | 8 | 9 | 10 | 11 | 12 | 13 | 14 | 15 | 16 | 17 | 18 |
|-------|---|---|---|---|---|---|---|---|---|---|----|----|----|----|----|----|----|----|----|
| C | | | W | Pr | e | | d | e | n | T | d | s | Fin | M | a | S | y | F | Pr |
| T | | | 1 | 3 | 2 | | 3 | 5 | 4 | 9 | 7 | 6 | 0 | 11 | 8 | 16 | 12 | 21 | 4 |

42

| Index | 19 | 20 | 21 | 22 | 23 | 24 | 25 | 26 | 27 | 28 | 29 | 30 | 31 | 32 | 33 | 34 | 35 | 36 | 37 |
|-------|----|----|----|----|----|----|----|----|----|----|----|----|----|----|----|----|----|----|----|
| C | u | h | Pr | r | A | Pr | o | u | u | n | u | r | Pr | Pr | r | e | Pr | t | |
| T | 31 | 17 | 6 | 5 | 20 | 1 | 23 | 34 | 10 | 6 | 18 | 6 | 5 | 2 | 30 | 5 | 7 | 19 | |

43

| Index | 38 | 39 | 40 | 41 | 42 | 43 | 44 | 45 | 46 | 47 | 48 | 49 | 50 | 51 | 52 |
|-------|----|----|----|----|----|----|----|----|----|----|----|----|----|----|----|
| C | | n | | | | | | | | | i | | | | |
| T | | 6 | | | | | | | | | 6 | | | | |

| Fin | 1 | 2 | 3 | 4 | 5 | 6 | 7 | 8 | 9 | 0 |
|---|---|---|---|---|---|---|---|---|---|---|
| 0 | 1 | 2 | 3 | 4 | 5 | 6 | 7 | 8 | 9 | 10 |

61

| Index | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| Char |  |  |  | 1 | 3 |  | 2 | 7 | 8 | 1 | 7 | 2 | 1 | 8 | 4 | Fin | 3 | 5 | 1 |
| Trans |  |  |  | 3 | 2 |  | 8 | 1 | 18 | 9 | 8 | 10 | 12 | 15 | 11 | 0 | 5 | 13 | 16 |

62

| Index | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|
| Char | 3 |  | 1 | 8 | 1 |  | 6 | 8 | 3 | 2 | 6 | 1 |  | 10 | 7 | 5 | 4 |  |  |
| Trans | 15 |  | 24 | 17 | 26 |  | 20 | 18 | 22 | 21 | 25 | 15 |  | 23 | 28 | 30 | 29 |  |  |

63

| Index | 38 | 39 | 40 |
|---|---|---|---|
| Char |  |  |  |
| Trans |  |  |  |

EFFICIENT STORAGE FOR FINITE STATE MACHINES

BACKGROUND OF THE INVENTION

1. Field of the Invention

Aspects of the present invention are directed generally to methods of providing efficient storage and, more particularly, to methods of providing efficient storage for finite state machines.

2. Description of the Background

Generally, finite state machines are used in language processing, such as natural language processing, for a wide range of tasks including the processing of dictionaries and expressions. Traditional methods of storing finite state machines, however, suffer either from excessive memory usage or from poor performance.

The diagram shown in FIG. 1 is a graphical description of a finite state machine, such as a sequential finite state transducer, which can be used to translate the names of the days of the week into a numeric counterpart. The circles define the states of the machine and the arcs define transitions.

With reference to FIG. 1, a method of storing the data of the states and the transitions includes the use of a transition matrix, a production matrix and a finality vector, as shown in FIGS. 2A, 2B and 2C, respectively, which reflect an assumption that that automation for the states and the transitions starts with State 1.

As may be seen from FIGS. 2A and 2B, both the transition and production matrices are sparsely populated. Therefore, it may be seen that each matrix wastes a relatively large amount of memory. In the particular case of the production matrix, it is sparse even with respect to the transition matrix.

As a solution to these and other problems, it has been seen that data compression may be used to reduce the sizes of the transition and production matrices. In particular, in accordance with one method of compressing the transition matrix so as to reduce the amount of required memory for the transition matrix, a row-compression storage method is generally employed. In this method, all non-zero data (e.g., each transition) is placed in an array along with some extra information needed to identify the state and character a transition refers to. This format uses an amount of storage that is proportional to the numbers of states and transitions, but finding the transition that is possible for a given state and input character in this case requires a searching operation to be performed. This requirement downgrades the performance of this solution.

Another solution, called row-displaced storage, overlays rows of the matrix to form a single array, and includes a second array of input characters as a means of identifying the transitions that belong to a state. Performance of this solution is similar to that of the performance of matrix storage, and the space requirements are often similar to, and sometimes even smaller than, the row-compressed storage. Unfortunately, sometimes the rows of the transition matrix do not fit well together, especially in the cases where the input alphabets are large.

SUMMARY OF THE INVENTION

In accordance with an aspect of the invention, a method of operating a storage of a finite state machine is provided and includes organizing information concerning an operation of the machine in a payload-transition matrix, in which a given, number of columns of the matrix reflect features of a state of the machine and other columns describe valid transitions between the states of the machine depending on input characters, and compressing the payload-transition matrix in a row-displaced format.

In accordance with another aspect of the invention, a method of operating a storage of a finite state machine is provided and includes organizing information concerning an operation of the machine in a payload-transition matrix, in which a given number of columns of the matrix reflect features of a state of the machine and other columns describe valid transitions between the states of the machine depending on input characters, reducing an alphabet of the machine by converting each of the valid transitions into a set of valid sub-transitions, and compressing the payload-transition matrix in a row-displaced format.

In accordance with another aspect of the invention, a method of operating a storage of a finite state machine is provided and includes, where the machine includes a set of words that have been converted into data that is characterized by a set of states linked by transitions specifying permissible input characters, generating a payload-transition matrix in which a given number of columns of the matrix reflect features of a state of the machine and other columns describe valid transitions between the states of the machine depending on input characters, and compressing the payload-transition matrix in a row-displaced format.

In accordance with another aspect of the invention, a method of operating a storage of a finite state machine is provided and includes, where the machine includes a set of words have been converted into data that is characterized by a set of states linked by transitions specifying permissible input characters, generating a payload-transition matrix in which a given number of columns of the matrix reflect features of a state of the machine and other columns describe valid transitions between the states of the machine depending on input characters, reducing an alphabet of the set of the words by secondarily converting each of the transitions into a set of sub-transitions, and compressing the payload-transition matrix in a row-displaced format.

In accordance with another aspect of the invention, a storage system for a finite state machine is provided and includes a storage unit configured to store the machine including data of a set of words that have been converted into data that is characterized by a set of states linked by transitions specifying permissible input characters, and a generating unit configured to generate a payload-transition matrix, in which a given number of columns of the matrix reflect features of a state of the machine and other columns describe valid transitions between the states of the machine depending on input characters.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIGS. 2A, 2B and 2C are representations of matrices containing the data of the sequential transducer of the prior art;

FIG. 5 shows a payload-transition matrix in accordance with an embodiment of the present invention;

FIG. 6 shows a set of matrices resulting from a compression of the payload-transition matrix of FIG. 5;

FIG. 8 shows a set of matrices resulting from a compression of a payload-transition matrix associated with the finite state machines of FIG. 8.

DETAILED DESCRIPTION OF THE INVENTION

Figure 1:
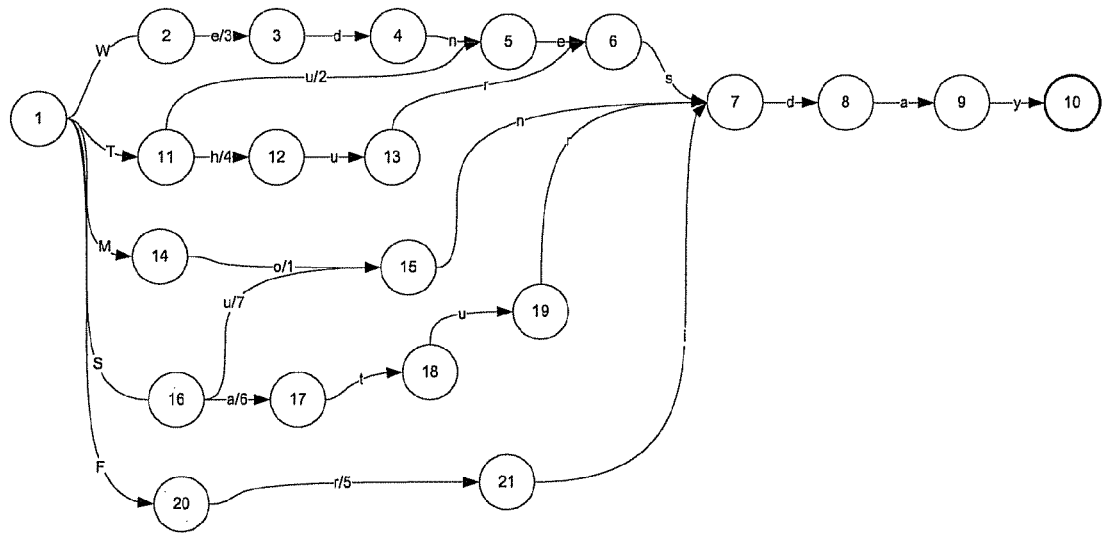
FIG. 1 is an illustration of a sequential transducer according to the prior art.
Figure 3:
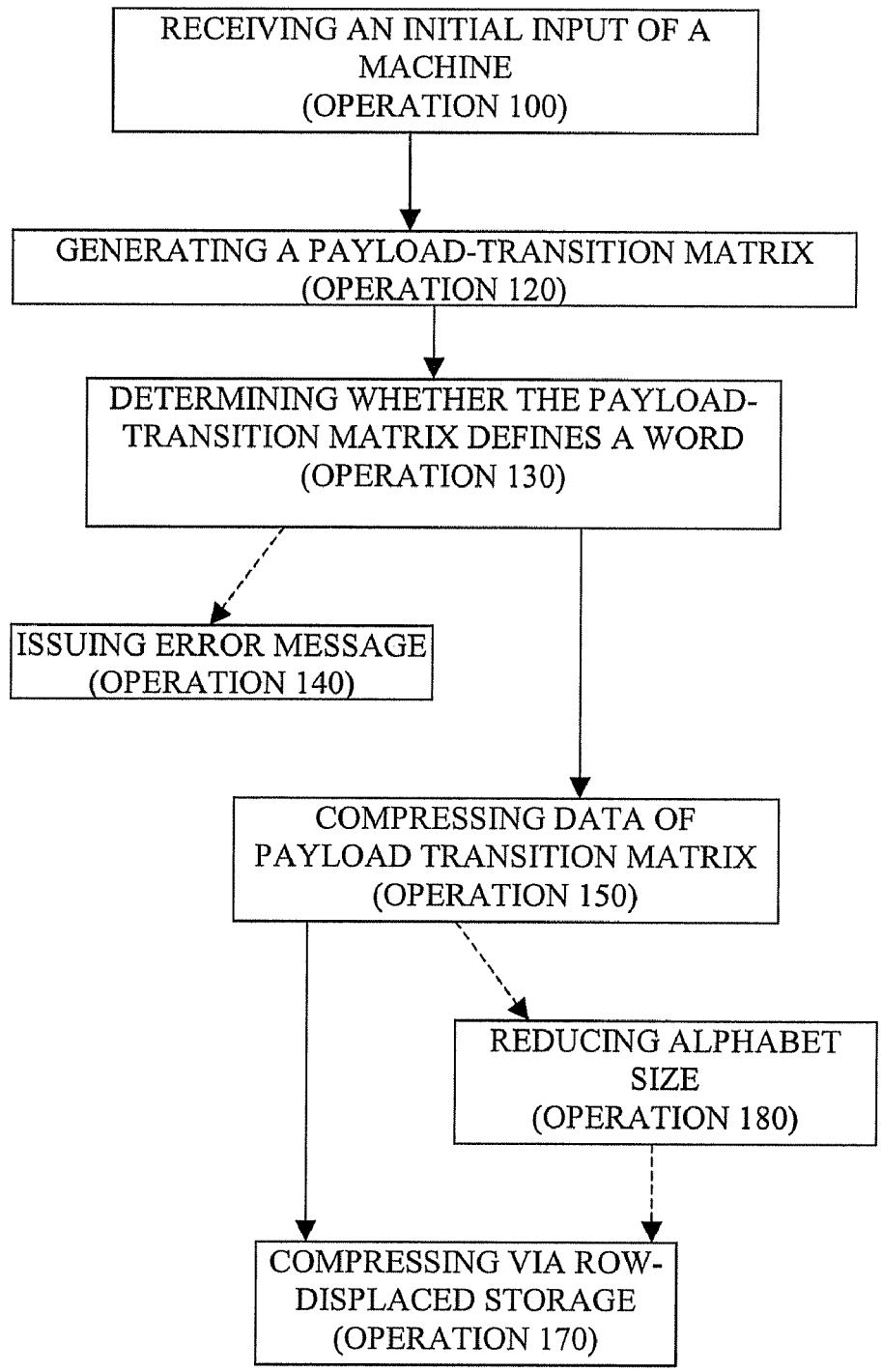
FIG. 3 is a flow diagram illustrating a method of operating a finite state machine in accordance with an embodiment of the present invention.

With reference to FIG. 3, in accordance with embodiments of the invention, a method of operating a storage of a finite state machine includes receiving an initial input of the machine (operation 100), organizing information concerning an operation of the machine in a payload-transition matrix, in which a given number of columns of the matrix reflect features of a state of the machine and other columns describe valid transitions between the states of the machine depending on input characters (operation 120), and compressing the payload-transition matrix (operation 150) in a row-displaced format (operation 170).

During the operation of the finite state machine, the method further includes determining whether the payload-transition matrix defines a subsequently inputted word (operation 130). Here, if the payload-transition matrix is found to not define the subsequently inputted word, the method may include issuing an error message indicating the same (operation 140).

In embodiments of the invention, in order to store the payload-transition matrix, the data provided by the payload-transition matrix is to be compressed (operation 150). As an example of the compression, the compression is to be accomplished via row-displaced storage (operation 170). Here, the method may further include reducing an alphabet of the set of the words by converting each of the transitions into a set of sub-transitions (operation 180).

Figure 4:
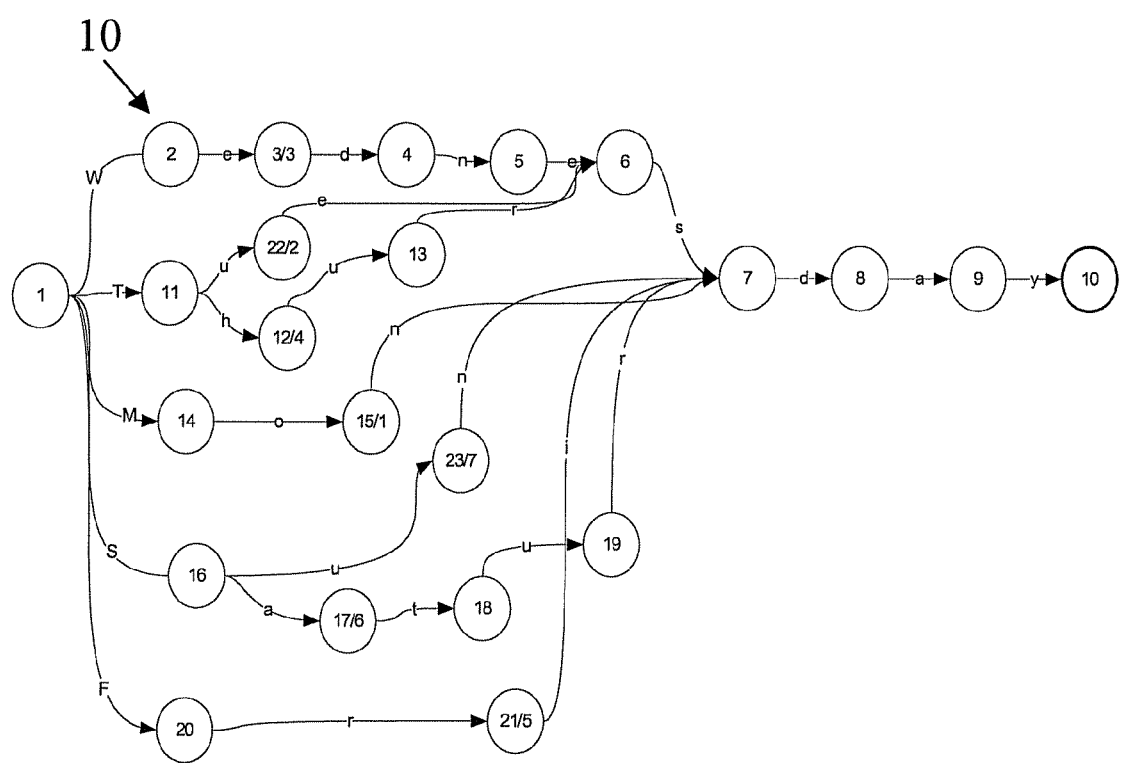
FIG. 4 shows an exemplary finite state machine in accordance with an embodiment of the present invention.

With reference to FIGS. 4 and 5, it is noted that the methods discussed above may be applied for use with a finite state machine (hereinafter referred to as "machine") 10 from which a payload-transition matrix 20 may be formed. In FIG. 4, the circles define states of the machine 10 and the arcs define transitions that accept input characters and which may define outputs. The payload-transition matrix 20 is formed by a transfer of the data of the sequential transducer 10 therein with the first and second columns 21 and 22 being the payload columns and the rest of the columns 23 being the transition columns. In more detail, the first column 21 is a finality vector that indicates an end of a word defined by the payload-transition matrix and the second column 22 is a production vector. With this structure, the payload-transition matrix 20 contains all of the information necessary to describe the machine 10.

That is, as shown in the application of the machine 10 in FIGS. 4 and 5 to the input "Friday", processing starts at the initial state of the machine, State 1. The current state (1) and input character (F) specify, respectively, a row and column of the payload-transition matrix 20. The cell at their intersection contains the value 20, therefore the machine accepts the input character and proceeds to State 20. The combination of State 20 and input character "r" leads to State 21. The output column of State 21 is non-empty, thus the output "5" is gathered. The characters "i", "d", "a", "y" are then processed to proceed, respectively, to States 7, 8, 9 and 10. Since the output is now fully consumed, the finality column of State 10 is examined. As it is "true", the input is accepted and the gathered output "5" is returned as the result of the application of the machine.

Formally, the machine 10 is defined by the following characteristics. First, the machine 10 includes a finite alphabet $E=\{e_0, e_1, \ldots, e_{|E|-1}\}$ specifying the distinct letters of the inputted words of the machine 10. Second, the machine includes a finite set of states S that are identified by natural numbers between 1 and |S|. Here, the finite set of states is between 1 and 23. Third, the machine 10 includes a number r of indices that is reserved for payloads and special transitions. Here, r is 2. Lastly, the machine 10 includes a partial payload-transition matrix of |S| rows and r+|E| columns.

To these ends, the machine 10 could be configured as a deterministic finite state automaton, a subsequential transducer and/or a non-deterministic finite state transducer among others. In each case, the resulting payload-transition matrix 20 is arranged somewhat differently but still contains all of the information necessary to describe the machine 10.

Where the machine 10 is configured as a deterministic finite state automaton in which A=(Q, E, δ, s, F), all of the states are indexed by natural numbers, the initial state s is mapped to the number 1, a natural number index is created for the alphabet, r is set to 1 and t is defined as t(q, 0)=0, if q is final, or is otherwise undefined, and t(q, i+1)=(q, $e_i$). The processing algorithm translates the input alphabet to integer indices, adding 1 to account for the reserved indices. After the processing of all of the characters in the input stream, the processing checks to determine whether t(q, 0) is defined for the current state q. If it is defined, the machine 10, being configured as a deterministic finite state automaton, accepts the input.

Where the machine 10 is configured as a subsequential transducer, the machine 10 pushes all productions into the following state and copies nodes as needed. The machine 10 sets r to 2 and creates indices for all states, input characters, productions and final productions while mapping the initial state to the number 1. Here, t is defined as t(q, 0)=undefined, if the state is not final. Otherwise, the final production of this state may be expressed as t(q, 0)=the production associated with termination in this state. The next column t(q, 1) is set to the production associated with this state, or left undefined if such a production is not present. The rest of the columns are set according to t(q, i+2)=δ(q, $e_i$). For each character of the input, the processing algorithm is begun with an examination of t(q, 1) for the current state q. If t(q, 1) is defined, the production indexed by the processing algorithm is performed. The processing algorithm then translates the next input character to its index, adding 2 to account for the reserved indices, and proceeds according to the payload-transition matrix 20. After the processing of all of the input characters, t(q, 0) is examined. If t(q, 0) is defined, the final production that is indexed by its value is performed, and the input is accepted.

Where the machine 10 is configured as a non-deterministic finite state transducer, the machine removes multiple duplicate transitions by creating state copies that are linked by epsilon transitions. This can be done in a way that ensures that each state has, at most, two epsilon transitions. The machine 10 then pushes all productions into the following state, sets r to 4 and creates indices for states, characters and productions. Here, the machine 10 defines t as in the expression, t(q, 0)=0, if q is final, otherwise undefined, t(q, 1)=the production associated with this state, if any, t(q, 2)=first epsilon transition, if it exists, t(q, 3)=second epsilon transition, if it exists, and t(q, i+4)=d(q, $e_i$). The traverse algorithm must examine t(q, 1) to decide if a production needs to be performed, as well as t(q, 2) and t(q, 3) to know if an epsilon transition can be made.

In further embodiments of the invention, as mentioned above, the storage of the payload-transition matrix 20 may be accomplished by compressing the data provided therein. The compression of the data may be accomplished via row-displaced storage (as in operation 170).

With reference to FIG. 6, a result of the compression by row-displaced storage is shown. Here, the combination of the narrow matrix 40 and the C-T matrices 41-43 is employed to allow for an association of each state with a unique base index with all of the valid payloads/transitions for each row in the payload-transition matrix 20 placed in the C-T matrices 41-43. Here, information for different states may cover intersecting regions as long as the bases are distinct and the valid payloads/transitions are not conflicting. Since the span of cells that refers to a given state is always the width of the payload-transition matrix 20, there is no additional need to store the number of valid transitions and the base associated with a state can be used as the sole identification of that state.

Using row-displaced storage, to look up the transition associated with a given input character, it suffices to map the character to an integer offset, add that offset to the base, check if he character code at this position matches the input code in C, and, if so, to extract the new base from the array T. Extracting the payloads is accomplished in a similar fashion.

As an example, consider the application of the machine described by FIG. 6 to the input string "Friday". Processing starts with the first state of the machine, identified by index 0. Translating the first input character "F" gives an offset of 17. As C[0+17] matches the input character, "F" is accepted as a valid character, and the processing continues with the next state identified by the index 21 (obtained from T[0+17]). The next character "r" translates to offset 12. The cell in the character array C[21+12] identified by the sum matches the input character, thus we continue with index 30 (obtained from T[21+12]). The rest of the characters "i", "d", "a", "y" are similarly processed in turn to obtain, respectively, offsets 18, 4, 7, 8 and indices 6, 7, 8, 12. As the input is now consumed, we verify the finality of the state identified by index 12. To do this we use the special code "Fin" which translated to offset 0. Since C[12+0] matches "Fin", the state is indeed final and the machine accepts the input.

At each step of the process it is also verified if the production column is not empty to gather the productions of the transducer. The special code "Pr" translates to offset 1. Out of all indices that were visited during the traverse above to process the input, only C[30+1] matches the code "Pr", thus only T[30+1] is used to obtain the production "5".

In equivalent embodiments of the invention, the character code array C may contain state indices or translated offsets instead of character codes.

Figure 7:
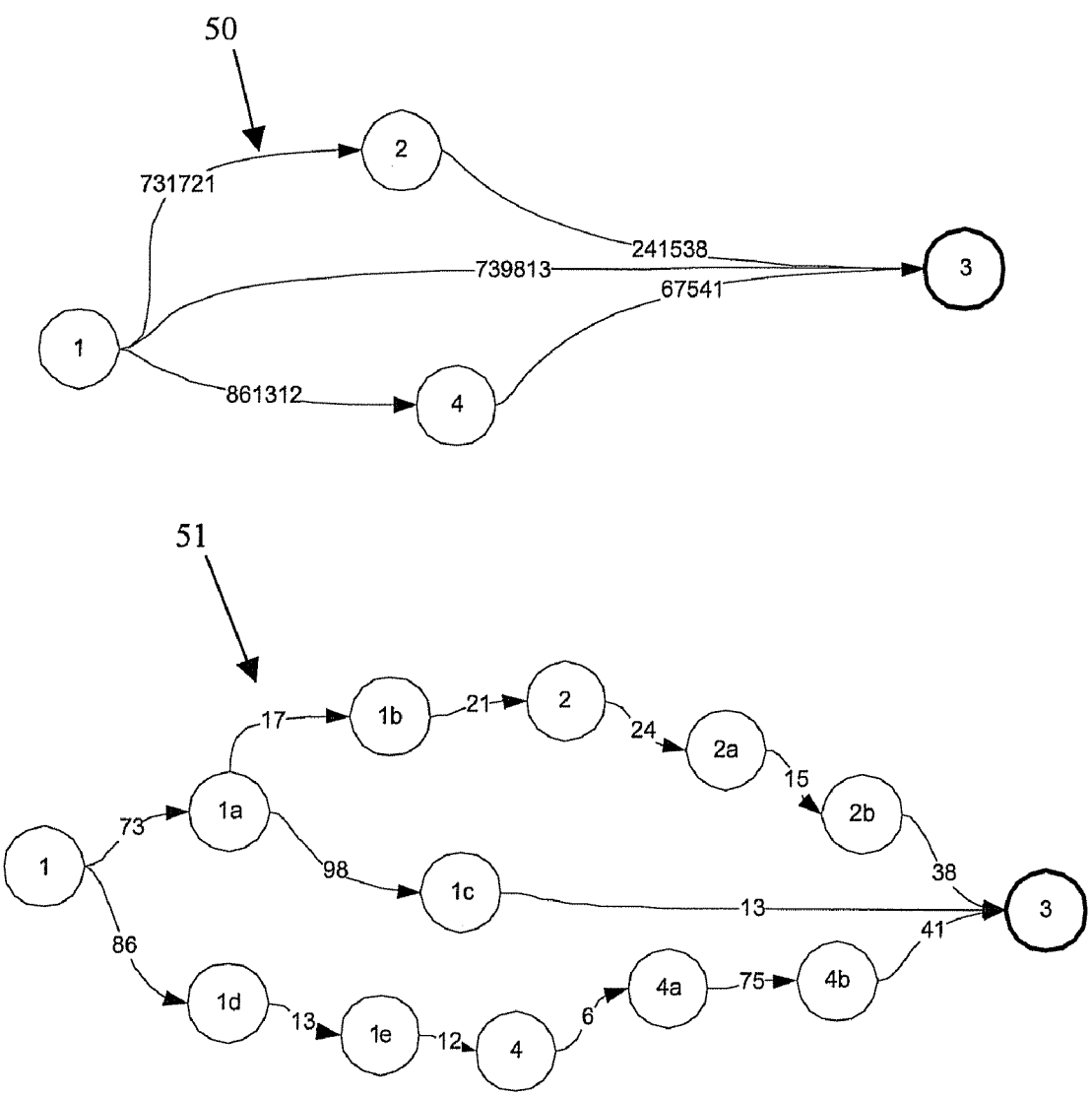
FIG. 7 shows exemplary finite state machines in accordance with an embodiment of the present invention.

With reference to FIGS. 7 and 8, in further embodiments of the invention and in cases of large input alphabets having thousands to millions of characters, the rows of the payload-transition matrix 20 may not form an efficient packing structure. Here, a reduction of the alphabet of the machine 10 by converting each of the transitions into a set of sub-transitions (as in operation 180) may be applied prior to the application of the row-displaced storage method.

That is, as shown by the structural differences between the finite state machine 50 and the finite state machine 51 of FIG. 7, alphabet size reduction involves the break up of transitions over a very large alphabet into several sub-transitions, with each sub-transition taking a part of the character code in the alphabet. The reduction can be done directly on the machine 10, or it can be performed internally to the storage structure to avoid all modifications of existing processing algorithms.

In detail and as shown by the matrices 60, 61, 62 and 63, for a target alphabet |E| and reduced size k, the alphabet size reduction is carried out one state at a time via a translation of all valid input characters to the base-k notation of their indices. A new lead state, which is initialized by copying all payloads from the old state, is created and a new state for each distinct leading digit in the notation is also created with links from the lead node using the respective character. Where the next digit is not the last digit, one proceeds with each of the newly created nodes and the next digit in the notation. For the last digit, links to the nodes pointed to by the original transitions are created. Finally, the old node is replaced by the new lead node.

In accordance with embodiments of the invention, the methods noted above may be embodied as a computer readable medium having executable instruction stored thereon to execute the methods.

Figure 9:
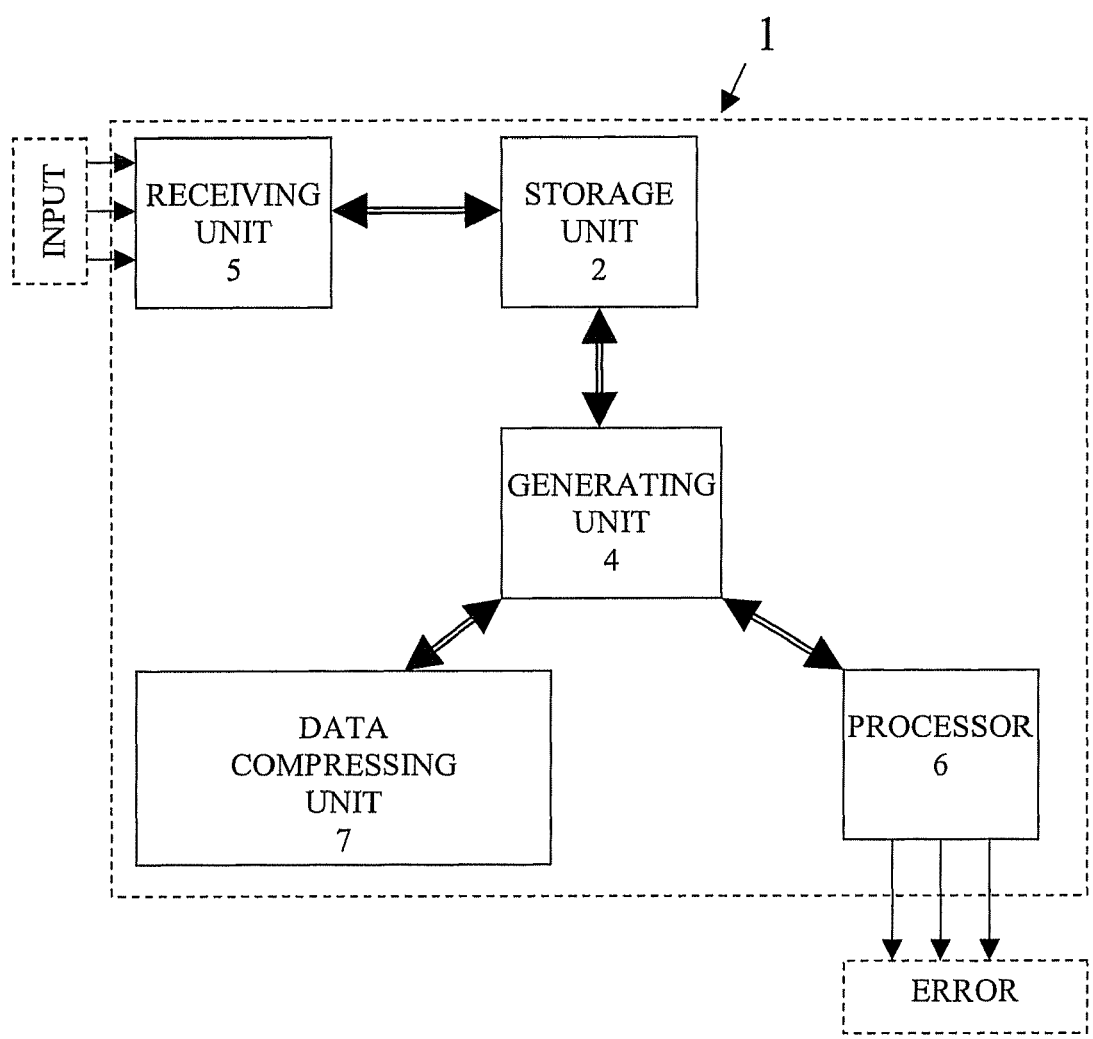
FIG. 9 shows an exemplary finite state machine in accordance with an embodiment of the present invention.

With reference to FIG. 9 and in accordance with another aspect of the invention, a storage system 1 of a finite state machine includes a storage unit 2 configured to store the machine including data of a set of words that have been converted into data that is characterized by a set of states linked by transitions specifying permissible input characters, and a generating unit 4. The generating unit 4 is configured to generate a payload-transition matrix 20 (see above), in which a given number of columns of the matrix 20 reflect features of a state of the machine and other columns describe valid transitions between the states of the machine depending on input characters.

The storage system 1 of the finite state machine may further include a receiving unit 5 configured to receive an initial input of the machine including the set of words to be defined, and a processor 6 configured to determine whether a subsequently inputted word is defined. The processor 6 is further configured to issue an error message indicating that the subsequently inputted word is not defined.

The storage system 1 of the finite state machine may further include a data compressing unit 7 configured to compress the generated payload-transition matrix 20 via row-displaced storage or any other suitable system. Where the data compressing unit compresses the data via row-displaced storage, the data compressing unit 7 may be further configured to reduce a size of the alphabet of the words inputted to the finite state machine 10 before applying the compression.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

I claim:

1. A method of operating a storage unit of a finite state machine, the storage unit comprising:

a computer readable medium having executable instructions stored thereon to execute the method, the method comprising:

organizing information concerning an operation of the machine in a payload-transition matrix, in which at least a first column is a finality vector indicating an end of data defined by the payload-transition matrix, a second column indicates production values of the data and other columns describe valid transitions between states of the machine depending on input characters; and compressing the payload-transition matrix in a row-displaced format associating the finality vector, the production values and each state with a unique base index.

2. The method according to claim 1, wherein the machine comprises a deterministic finite state automaton.

3. The method according to claim 1, wherein the machine comprises a subsequential transducer.

4. The method according to claim 1, wherein the machine comprises a non-deterministic finite state transducer.

5. The method according to claim 1, wherein the method further comprises transforming a dictionary of words into the machine.

6. The method according to claim 5, further wherein the method further comprises:

testing the machine to determine whether a word appears in the dictionary; and listing contents of the dictionary.

7. A method of operating a storage unit of a finite state machine, the storage unit comprising:

a computer readable medium having executable instructions stored thereon to execute the method, the method comprising:

organizing information concerning an operation of the machine in a payload-transition matrix, in which at least a first column is a finality vector indicating an end of data defined by the payload-transition matrix, a second column indicates production values of the data and other columns describe valid transitions between states of the machine depending on input characters;

reducing an alphabet of the machine by converting each of the valid transitions into a set of valid sub-transitions; and compressing the payload-transition matrix in a row-displaced format associating the finality vector, the production values and each state with a unique base index.

8. A method of operating a storage unit of a finite state machine, the storage unit comprising:

a computer readable medium having executable instructions stored thereon to execute the method, the method comprising:

where the machine includes a set of words that have been converted into data that is characterized by a set of states linked by transitions specifying permissible input characters, generating a payload-transition matrix in which a given number of columns of the matrix reflect features of a state of the machine and other columns describe valid transitions between the states of the machine depending on input characters;

compressing the payload-transition matrix in a row-displaced format;

determining whether a subsequently inputted word is defined; and issuing an error message indicating that the subsequently inputted word is not defined.

9. The method according to claim 8, wherein the method further comprises receiving an initial input of the machine.

10. A computer readable medium having executable instructions stored thereon to execute the method according to claim 8.

11. A method of operating a storage unit of a finite state machine, the storage unit comprising:

a computer readable medium having executable instructions stored thereon to execute the method, the method comprising:

where the machine includes a set of words have been converted into data that is characterized by a set of states linked by transitions specifying permissible input characters, generating a payload-transition matrix in which a given number of columns of the matrix reflect features of a state of the machine and other columns describe valid transitions between the states of the machine depending on input characters;

reducing the alphabet of the set of the words by secondarily converting each of the transitions into a set of sub-transitions;

compressing the payload-transition matrix in a row-displaced format;

determining whether a subsequently inputted word is defined; and issuing an error message indicating that the subsequently inputted word is not defined.

12. A storage system for a finite state machine comprising:

a storage unit including a computer readable medium having executable instructions stored thereon, which is configured to store the machine including data of a set of words that have been converted into data that is characterized by a set of states linked by transitions specifying permissible input characters;

a generating unit configured to generate a payload-transition matrix, in which at least a first column is a finality vector indicating an end of each of the words, a second column indicates production values of the words and other columns describe valid transitions between states of the machine depending on input characters; and a data compressing unit configured to compress the generated payload-transition matrix in a row-displaced format associating the finality vector, the production values and each state with a unique base index.

13. The finite state machine according to claim 12, further comprising a receiving unit configured to receive an initial input of the machine.

14. The finite state machine according to claim 12, further comprising a processor configured to determine whether a subsequently inputted word is defined.

15. The finite state machine according to claim 14, wherein the processor is further configured to issue an error message indicating that the subsequently inputted word is not defined.

16. The finite state machine according to claim 12, wherein the data compressing unit is further configured to reduce a size of an alphabet of the words.

* * * * *